No. 772,750. PATENTED OCT. 18, 1904.
P. S. SMITH.
METHOD OF COVERING PAPER BOXES.
APPLICATION FILED OCT. 3, 1901.
NO MODEL. 2 SHEETS—SHEET 1.
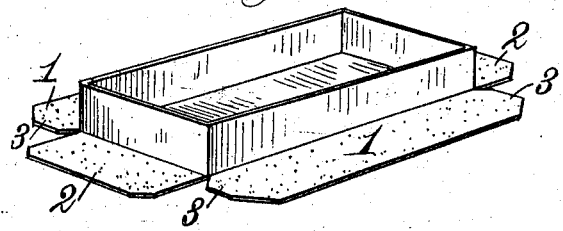
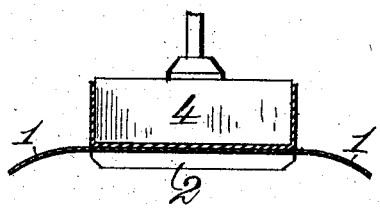
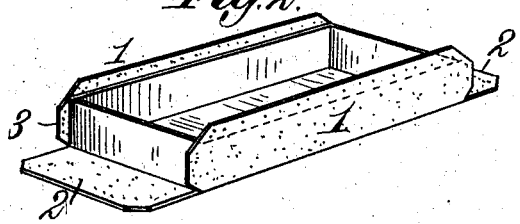
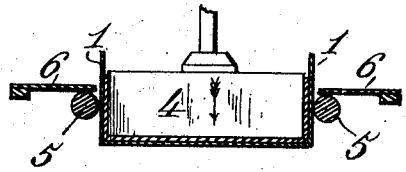
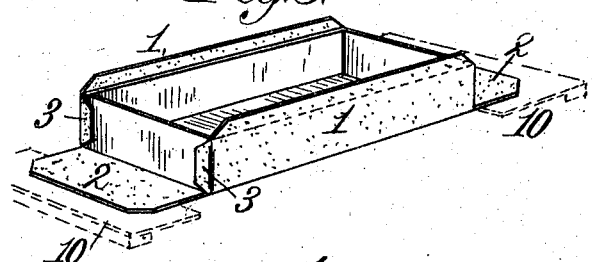
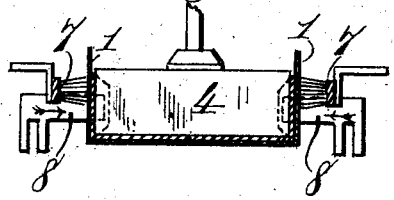
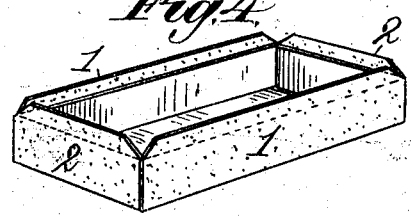
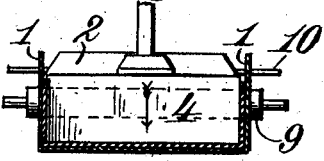
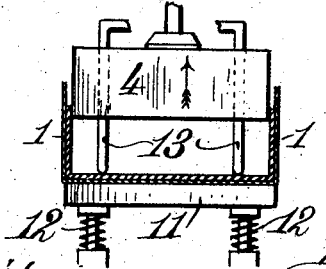
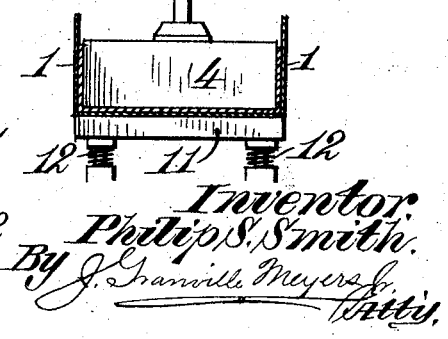
Witnesses
Robert Everett
Wm M Stockbridge
Inventor
Philip S. Smith
By J. Granville Meyers Jr.
Atty.

No. 772,750. PATENTED OCT. 18, 1904.
P. S. SMITH.
METHOD OF COVERING PAPER BOXES.
APPLICATION FILED OCT. 3, 1901.
NO MODEL. 2 SHEETS—SHEET 2.

Witnesses.
Robert Everitt.
Wm. M. Stockbridge.

Inventor:
Philip S. Smith.
By J. Granville Meyers Jr.
Atty.

No. 772,750. Patented October 18, 1904.

UNITED STATES PATENT OFFICE.

PHILIP S. SMITH, OF PHILADELPHIA, PENNSYLVANIA.

METHOD OF COVERING PAPER BOXES.

SPECIFICATION forming part of Letters Patent No. 772,750, dated October 18, 1904.

Application filed October 3, 1901. Serial No. 77,400. (No model.)

*To all whom it may concern:*

Be it known that I, PHILIP S. SMITH, a citizen of the United States, residing at Philadelphia, in the county of Philadelphia and State of Pennsylvania, have invented new and useful Improvements in Methods of Covering Paper Boxes, of which the following is a specification.

This invention relates to an improved method of covering paper boxes, and has for its object to provide an improved, simple, and inexpensive method of applying and affixing to the outside of paper boxes covering blanks or strips of thin paper or the like in an expeditious, economical, and thorough manner and in such a manner that the covering will be smoothly, neatly, and effectually applied and affixed to the boxes and the latter will when completely covered retain their true shape.

To these ends my invention consists in the novel method hereinafter described, and particularly pointed out in the claims following the description, reference being had to the accompanying drawings, forming a part of this specification, wherein—

Figure 11:
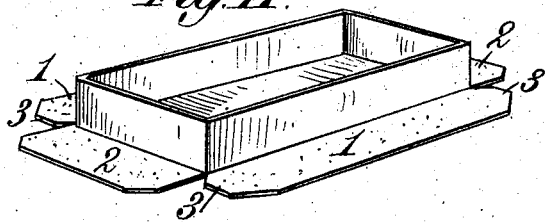
Figure 12:
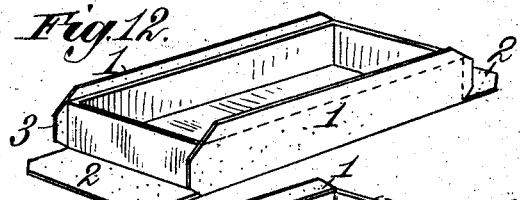
Figure 13:
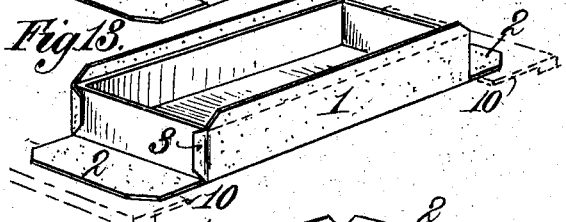
Figure 14:
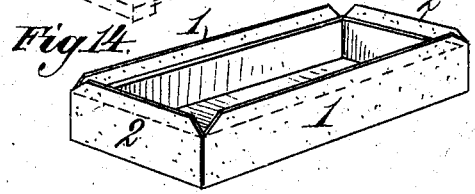
Figure 15:
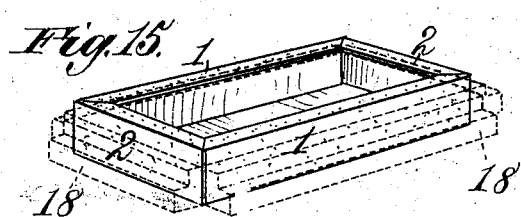
Figure 16:
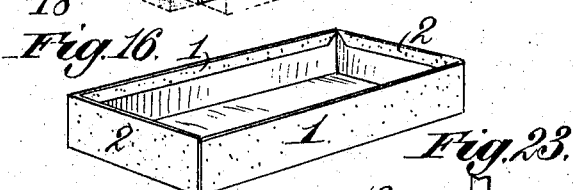

Figure 1 is a perspective view of a box to be covered, showing the same centered on a covering-blank. Fig. 2 is a similar view showing the side flaps of the blank folded up against the sides of the box. Fig. 3 is a similar view showing the ends of the side flaps folded or turned in against the ends of the box. Fig. 4 is a perspective view showing the box completely covered according to one mode of procedure; and Figs. 5 to 10, inclusive, are views showing the box and cover at different steps in the operation of applying and affixing the cover. Figs. 11 to 16, inclusive, show the box and cover when a slightly-modified mode of procedure is adopted, Fig. 11 showing the box centered on the blank, Fig. 12 showing the side flaps folded up against the sides of the box, Fig. 13 showing the ends of the side flaps turned or folded in against the ends of the box, Fig. 14 showing the end flaps folded up against the ends of the box, Fig. 15 showing the edges of the side and end flaps tucked in over the upper edges of the box, and Fig. 16 showing the edges of the side and end flaps folded down against the interior of the box. Figs. 17 to 23, inclusive, show the box and cover during different steps in the operation of applying and affixing the cover as illustrated in Figs. 11 to 16.

Before proceeding to describe my improved method of covering boxes I will preface the description by stating that the terms "sides" and "ends" are only relative and are employed for the sake of clearness of description and to avoid unnecessary prolixity, it being evident that perfectly square boxes may be covered, in which case there would be no distinction between the sides and ends, all of the vertical walls of the box being then sides or ends.

Preliminary to covering the boxes suitable covering-blanks are prepared by cutting from thin paper or other suitable material suitable-sized blanks the bodies of which are of approximately the same size and shape as the bottom of the box to be covered and forming integrally with the sides and ends of such blank-bodies side flaps 1 and end flaps 2, as is customary in the art. Paste or other suitable adhesive is applied to one side of the body of the blank and its side and end flaps, or instead of applying the paste to one entire side of each of the side flaps 1 it may only be applied to the ends 3 of said side flaps. The bottom of the box is then centered on the body of the blank, as shown in Fig. 1 of the drawings, whereupon the cover is in readiness to be applied and affixed to the box in accordance with my improved method, which I will now describe; but before doing so I will state that I have shown and will briefly allude in an elementary manner to only so much apparatus as it is necessary to show and describe for carrying out the method, by "mechanism" it being understood, of course, that the method may be performed by simple manipulation. The apparatus forms no part of the present invention. After the box has been centered on the blank in the manner described it is placed on a vertically-reciprocating plunger 4, as shown in Fig. 5. Said plunger consists of a block of wood or other suitable material of a size and shape to neatly fit the interior of the box and support the same from within. Two rollers 5 are arranged below the plunger parallel to each other and are so disposed that the sides of the box can just pass between them. Owing to the thin nature of the material of which the blank is made and to the paste which is applied to the side and end flaps, said flaps have a tendency to droop down and curl up under the box, and when this occurs the flaps will not be properly engaged by the rollers and are apt to smear the latter with paste. To avoid such result, horizontal blades, plates, or strips 6 are arranged directly over the rollers, as most clearly shown in Fig. 6. When the plunger 4 is caused to descend, the blades 6 form shelves or supports on which the side flaps rest, and as the plunger continues to descend the box is carried down between the two rollers 5, which operate to press the side flaps 1 of the blank smoothly against the sides of the box in the position shown in Fig. 2. Arrranged immediately below the covering-rollers 5 are two stiff brushes 7, (see Fig. 7,) and the plunger continuing to descend the box after passing between the rollers is immediately passed between said brushes, which not only operate to press the side flaps 1 against the sides of the box, but perform the very important additional function of pressing and holding the sides of the box against the plunger. The brushes also serve another important purpose. The box is held in place on the plunger by the several different sets of rollers in its passage between the latter; but after it has passed between the rollers 5 and before reaching the rollers 9 (hereinafter referred to) there would be no means of holding the box on the plunger were it not for the brushes. Said brushes, however, in pressing the side flaps against the sides of the box operate, in addition to their other functions, to hold the walls of the box flat while the end-turn-in wings are folding in the ends of the side flaps and during the passage of the plunger and box from the rolls 5 to the rolls 9. While the box is between the brushes the plunger is held stationary for a moment to permit the ends 3 of the side flaps 1 of the blank to be folded in against the ends of the box. This is accomplished by thin metallic blades or wings 8, (see Fig. 7,) which are moved horizontally toward one another and across the ends of the box, engaging the ends 3 of the side flaps of the blank and folding them against and affixing them to the ends of the box. During this operation brushes 7 continue to hold the side flaps against the sides of the box and the sides of the box closely and squarely against and onto the plunger, whereby the said sides are prevented from bowing or bulging out, by which means the ends 3 are folded in tightly across and fixed to the ends of the box, and this is especially true in those cases where the paste is only applied to the ends 3 of the side flaps of the blank. The side flaps are then fixed to the sides and ends of the box, as shown in Fig. 3.

Arranged beneath the end-turn-in wings 8 are two parallel rollers 9, so disposed that the ends of the box can just pass between them. The plunger being caused to again descend, the box is withdrawn from between the end-turn-in wings and the brushes and is carried down between the rollers 9. Arranged above the rollers 9 are guard strips or blades 10, similar in all respects to the blades 6, before described, and such blades first engage and support the end flaps 2 before the latter pass between the rollers 9. As the box is carried down between said rollers the latter operate to fold and press the end flaps smoothly and closely against the ends of the box, to which they adhere through the medium of the paste applied to the blank, as before described. The plunger continuing to descend, the bottom of the box is forced against a platen arranged beneath the rollers 9. Said platen consists of a flat block or table 11, which is yieldingly supported on coiled springs 12. (See Fig. 9.) As the box is forced against the platen the latter operates to press the body of the blank against the bottom of the box and firmly affixes the blank to said bottom. Carried by the plunger 4 and vertically movable therein are two stripper-rods 13, and after the bottom of the box has been pressed against the platen in the manner described the plunger is caused to ascend. The stripper-rods, however, through the medium of means not shown, are held stationary, their lower ends bearing against the inner side of the bottom of the box, and hold the box against the platen. Hence as the plunger ascends said rods operate to strip the box from the plunger, leaving it in its finished state, as shown in Fig. 4, resting on the platen.

From the foregoing it will be seen that the operation of covering the box involves several separate successive steps, viz: The box is first centered on the blank and placed on the plunger. The box is next forced down between the guard-strips 6 and rollers 5, thereby folding the side flaps against the sides of the box. Then the box is moved down between the brushes 7 and temporarily held therebetween while the end-turn-in wings 8 turn in and fold the ends 3 of the side flaps against the ends of the box. Then while the end-turn-in wings are still holding the ends of the flaps against the ends of the box the latter is moved downward from between the brushes and end-turn-in wings between the rollers 9, which fold and press the end flaps against the ends of the box. Next the box is moved down against the platen, which affixes the body of the blank to the bottom of the box, and finally the box is stripped from the plunger. These several operations are separate and distinct, but are performed in rapid succession. Passing the box between the brushes and holding it in such position forms an important step in the operation, as the side flaps are held against the sides of the box and the sides of the box against and onto the plunger while the end-turn-in wings are folding the ends of the side flaps against the ends of the box. By withdrawing the box from between the end-turn-in wings before the latter are retracted all liability of the turned-in ends of the side flaps being drawn back with the end-turn-in wings is avoided. After having undergone the several operations described the covering material is firmly, smoothly, and neatly secured to the bottom, sides, and ends of the box, the edges of the side and end flaps projecting above the edges of the box, as shown in Fig. 4.

Figure 17:
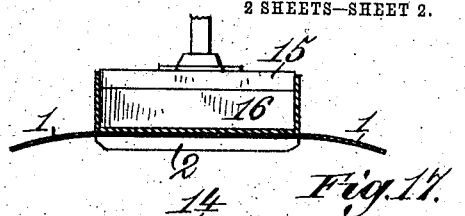
Figure 18:
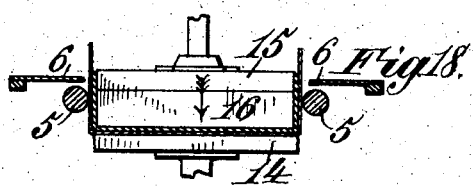
Figure 19:
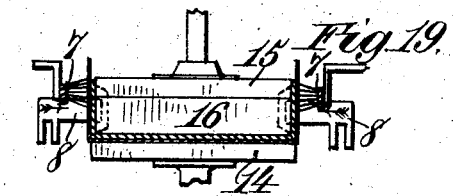
Figure 20:
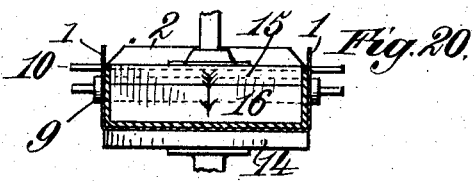
Figure 21:
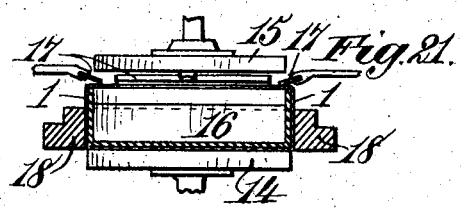
Figure 22:
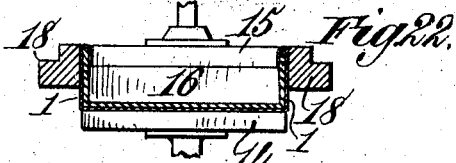
Figure 23:
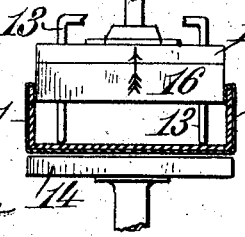

Some branches of the trade demand boxes covered in the manner described, whereas others demand boxes in which the edges of the blank are folded over the edges of the box and are pasted to the interior thereof. In carrying out my improved method in covering boxes of the last-named description I proceed as follows, reference being had to Figs. 11 to 23 of the drawings: The box is centered on the blank in the manner before described and as shown in Fig. 11, paste having been applied to the upper side of the blank, or the blank may be properly laid on the platen 14, the box then placed on the plunger, and the latter, with the box arranged thereon, lowered onto the covering-blank resting on the platen. According to this variation of the method the plunger is made in two separate parts 15 and 16, each of the same size in horizontal section, the two parts of the plunger being superimposed one upon the other, as shown in Fig. 17. The platen 14 is held up against the bottom of the plunger with a yielding pressure through the medium of means not shown and bears against the bottom of the box throughout the several operations hereinafter described. After the box has been placed upon the plunger the latter is caused to descend, passing between the guard-strips 6 and rollers 5, which latter fold the side flaps 1 against the sides of the box in the manner before described and as shown in Fig. 12. The plunger continues to descend, carrying the box down between the brushes 7, when the plunger is temporarily held stationary. (See Fig. 19.) The brushes hold the side flaps against the sides of the box and the sides of the box against the plunger, while the end-turn-in wings move forward and turn in and press the ends 3 of the side flaps against the ends of the box, as shown in Fig. 13, and while the end-turn-in wings are still pressing the ends of the side flaps against the ends of the box the plunger is again moved downward, carrying the box down from between the end-turn-in wings and the brushes and down between the guard-strips 10 and the rollers 9, (see Fig. 20,) which latter operate to fold the end flaps 2 against the ends of the box, as shown in Fig. 14. During these several operations the platen continues to press against the bottom of the box, firmly affixing the body of the blank thereto. The blank is now affixed to the bottom, sides, and ends of the box, the edges of the blank projecting above the edges of the box, as shown in Fig. 14. So far as described the method of procedure has been the same as that first described. To fold the projecting edges of the banks over the edges of the box and to affix them to the interior of the latter, however, involves several further steps, and these I will now describe. Arranged on all four sides of the path of movement of the plunger are movable blades 17, (see Fig. 21,) which I term "edge-tuck-in" fingers, each consisting of a flat blade, strip, or bar of approximately the same length as the flap which it is designed to engage. Said edge-tuck-in fingers are adapted to be moved toward and from one another by suitable mechanism, (not shown,) and normally they lie out of the path of the plunger. Arranged beneath the edge-tuck-in fingers are four presser-bars 18, arranged at right angles to each other, which are adapted to be moved toward and from and engage the sides and ends of the box with a yielding pressure by suitable mechanism. (Not herein illustrated.) After the plunger passes down from between the rollers 9 it passes between the presser-bars 18 until the lower member 16 of the plunger lies in the same plane with the presser-bars, when the plunger is arrested and held stationary. Just before the plunger reaches such position, however, the descent of the upper member 15 is arrested by suitable means, (not shown,) whereby the two members 15 and 16 of the plunger are separated, as shown in Fig. 21. When the lower member 16 of the plunger has arrived between the presser-bars 18 and has come to a state of rest, said presser-bars are caused to move inward and press the lower portions of the sides and ends of the box against the lower member of the plunger, thereby holding each of them rigidly in a straight plane. While the presser-bars are still pressing the box against the lower member of the plunger the edge-tuck-in fingers are caused to approach one another and engage and tuck in or fold the projecting edges of the side and end flaps horizontally between the upper and lower members of the plunger and over the upper edges of the box, as shown in Fig. 15. The edge-tuck-in fingers are then withdrawn or caused to recede, and the upper member 15 is forced down within the box, forcing the tucked-in edges of the side and end flaps ahead of it and down along the inner sides and ends of the box until the upper member again rests on the lower member. The presser-bars are then caused to move slightly away from the box and the plunger to descend until the upper member of the plunger lies between the presser-bars, when the plunger is again brought to a state of rest and the presser-bars are again moved inward and across the upper parts of the sides and ends of the box against the upper member of the plunger, as shown in Fig. 22, thereby rigidly holding each of them in a straight plane and firmly pressing the previously tucked-in and folded-down edges of the side and end flaps against the interior of the box, and thereby firmly affixing them thereto, as shown in Fig. 16. The presser-bars are again retracted and the plunger raised; but the stripper-rods are held stationary during the initial upward movement of the plunger and holding the box to its seat on the platen operate to strip the box from off the plunger in the manner before described.

From the foregoing it will be seen that the presser-bars serve to hold the side and end walls of the box in perfect planes and at right angles to each other and to the bottom during the operation of the edge-tuck-in fingers. This is very important for the following reason: It is a well-known fact that boxes made from paper or pasteboard, and especially those made from cheap or flimsy stock, have a decided flare or bulge at the sides, or both sides and ends, or, in other words, the sides or sides and ends of the rough uncovered box do not maintain a true right-angular position with respect to its bottom, and this flare or bulge is materially increased by the application to the box-walls of a covering strip or blank that is moist or wet with glue. It will be apparent, therefore, if it is attempted to tuck the projecting edges of the covering material over the edges of a box whose sides and end walls, either or both, are flared or bulged outward said covering material will become puckered, creased, or wrinkled to such an extent as to not only detract materially from the finished box, but in most cases to render the box unfit for use or sale. According to my present method this objection is entirely overcome, and this is accomplished by holding the sides or both sides and ends of the box in perfect planes, or at right angles to each other and to the bottom, by applying pressure externally thereof and performing the operation of tucking the projecting edges of the covering material over the edges or down into the box during the continuance of this external pressure or while the walls of the box are so held.

As has heretofore been stated, the terms "sides" and "ends" as applied to the box are only employed in a relative sense for the sake of description and by said terms may be meant either of the vertical walls of the box, the precise order in which the flaps are folded against and affixed to the box being immaterial.

In the foregoing I have described the cover as being applied and affixed to a set-up and completed box—that is to say, a box bent up into shape, stayed, and finished in every respect, excepting being covered. It will be manifest, however, to those skilled in the art that the covering may be applied to an unstayed box-blank, or, in other words, to a box-blank folded up in shape, but not stayed or fastened at its corners. When such a method of procedure is adopted, the covering-blank having paste properly applied thereto is laid upon the platen with its pasted side disposed uppermost, and the folded-up but unstayed box-blank is then superimposed thereon, or the folded-up box-blank may be placed upon the plunger in the manner heretofore described. The plunger is then caused to descend, and during the several successive steps before described the covering-blank is applied to the box-walls. When the box is covered in such manner, the turned-in ends of the side flaps serve to hold the sides and ends of the box in their folded-up positions. I wish it to be distinctly understood, therefore, that in the claims appended hereto wherever it is stated that the box is centered upon the body portion of the covering-blank or that the flaps are folded against the sides or ends of the box or the box is referred to in other manner by the term "box" I mean to include either the box-blank folded up and stayed into shape or in its unstayed condition.

Having described my invention, what I claim is—

1. The method herein described of covering paper boxes with a covering-blank having a body portion and side and end flaps, which consists in first centering the box upon the body portion of the blank, supporting the box from within, folding the side flaps up against the sides of the box and holding them thereagainst by pressure applied externally of the box and flaps, folding the ends of said flaps inward against the ends of the box and affixing them thereto by pressure during the continuance of said external pressure, and finally folding the end flaps up against the ends of the box and pressing them thereagainst 2. The method herein described, of covering paper boxes with a covering-blank having a body portion and side and end flaps, said method consisting in first centering the box upon the body portion of the blank and affixing the same thereto, folding the side flaps up against the sides of the box and holding them thereagainst with a yielding pressure applied externally of the box and flaps, folding the ends of said side flaps inward against the ends of the box and affixing them thereto during the continuance of said external pressure, folding the end flaps up against the ends of the box and affixing them thereto, and applying pressure to the bottom of the box to firmly affix the body of the covering-blank thereto, substantially as set forth.

3. The method herein described of covering paper boxes with a gummed covering-blank having a body portion and side and end flaps, said method consisting in first centering the bottom of the box upon the body portion of the blank, then folding the side and end flaps up against the sides and ends of the box leaving a portion of the flaps projecting above the upper edge of the box and affixing said flaps to the walls of the box by pressure, then holding the sides and ends of the box in perfect planes and at right angles to each other and to the bottom by applying external pressure thereto, and finally turning the said projecting portions of the flaps over the edges of the box and down against the inner walls thereof during the continuance of said external pressure, substantially and for the purpose set forth.

4. The method herein described of covering paper boxes with a covering-blank, whose surface area is greater than the combined surface area of the bottom, sides and ends of the box, which consists in first centering the box on the blank, then folding opposite sides of the blank up against opposite side walls of the box, leaving a portion thereof projecting above the upper edges of the said side walls, and holding the same thereagainst by pressure applied externally thereof, then folding the opposite end portions of said folded-up sides of the blank inward against the ends of the box while the said folded-up sides are being thus held, then folding the opposite ends of the blank up against the opposite end walls of the box, leaving a portion thereof projecting above the upper edges of said end walls, then holding the walls of the box in straight planes by applying external pressure thereto, then folding said projecting portions of the covering-blank inward over the edges of the box-walls during the continuance of said external pressure and while the walls are thus held in straight planes, and finally turning said inwardly-folded portions downward into the box and pressing them against the inner faces of the walls to affix them thereto.

5. The method herein described of covering paper boxes with a gummed covering-blank having a body portion and side and end flaps, which consists in first applying the bottom of the box to the body portion of the blank and folding the side and end flaps of the latter against the side and end walls of the box and affixing the same thereto by pressure, leaving a portion of each flap extending above the upper edge of the box, then holding said box-walls in perfect planes and at right angles to each other and to the bottom by applying external pressure to said walls, then folding said extending portions of the flaps inward over the top edges of the box and down against the inner walls thereof during the continuance of said external pressure, and finally applying further external pressure to the upper part of the sides and ends of the box to firmly affix the turned-over portions of the flaps to the inside thereof.

6. The method herein described of applying a covering-blank to a paper box, said blank having side and end flaps, and said method consisting in supporting the box from within, then folding the side flaps up against the two walls of the box and forcibly and rigidly holding said walls in straight planes by applying lateral pressure thereto, then folding the ends of said side flaps inward against the ends of the box and affixing them thereto by pressure while the said two side walls are thus forcibly and rigidly held, and finally folding up and pressing the end flaps of the blank to the ends of the box, substantially as and for the purpose set forth.

7. As an improvement in the art of covering boxes with covering material, the method which consists in applying the covering material to the outer side walls of the box leaving a portion projecting above the upper edge thereof, then holding said walls in straight planes by applying external pressure thereto, then folding said projecting portions of the covering material inward over the edges of the box-walls during the continuance of said external pressure and while the walls are thus held in straight planes, then turning said inwardly-folded portions downward into the box and pressing them against the inner sides of the walls to affix them thereto.

In testimony whereof I have hereunto set my hand in presence of two subscribing witnesses.

PHILIP S. SMITH.

Witnesses:
PAUL O. KIRSCHMANN,
JAMES B. REYNOLDS.